UNITED STATES PATENT OFFICE.

RALPH BAGGALEY, OF PITTSBURG, PENNSYLVANIA.

METHOD OF GENERATING STEAM FROM WASTE HEAT OF SLAG.

No. 846,817.　　　Specification of Letters Patent.　　Patented March 12, 1907.

Application filed October 14, 1904. Serial No. 228,486.

*To all whom it may concern:*

Be it known that I, RALPH BAGGALEY, of Pittsburg, in the county of Allegheny and State of Pennsylvania, have invented a new and useful Method of Generating Steam from the Waste Heat of Slag, of which the following is a full, clear, and exact description.

The object of my invention is to utilize successfully the waste heat of slag for the generation of steam, and particularly slag that results from the smelting of copper ores in a blast-furnace.

Molten slag is corrosive and injurious to all metals when it comes into contact with water-jacketed surfaces or with heavy metal walls or with walls of some refractory material, and it instantly forms skulls which constitute partitions between the body of molten material and the walls. Such slag skulls are non-conductors of heat, and it is most difficult to transmit heat through them from a body of molten slag to the water contained in the boiler, so as to produce effective steam-pressure. These facts make it difficult to utilize by one operation more than a small percentage of the contained units of heat in the slag.

Notwithstanding the formation of heat-non-conducting skulls on the walls of a boiler and around water-tubes, I have discovered that if the feed-water be preheated sufficient heat will be transferred from the slag through the skulls to the preheated feed-water in the water-tubes to generate steam, wherefore the preheating of the feed-water is an important feature of the present invention.

There is a great difference—say 50° Fahrenheit—in the temperature of water that may be used for the generation of steam—such, for instance, as the temperature in winter and in summer. An apparatus that may work successfully in the summer-time may fail in the winter-time, owing to the great difference in the temperatures at which the feed-water might be fed into the boiler. The problem will be greatly simplified if the feed-water can be delivered into the boiler at uniform temperatures in winter and in summer, and if the feed-water is delivered into the boiler at a uniform temperature of, say, 212° the mere addition of 40° or 50° of heat after it has been delivered into the boiler will suffice to produce effective steam-pressure for actual work. In contradistinction to this suppose water during the severe winter is delivered into the boiler at, say, 32° Fahrenheit, the amount of heat that must be transmitted from the slag to such cold water after it is in the boiler will be so great as to render the process impracticable. I have discovered these difficulties in a long series of investigations, and the prevention of these difficulties constitutes the essence of my present invention. To accomplish this result, I utilize varying proportions of the waste heat produced by the slag to bring the temperature of the feed-water up to approximately 212° Fahrenheit in any convenient vessel or apparatus suitable for the purpose and thereafter I deliver such preheated feed-water into a suitable slag-boiler or slag steam-generator suitable for the purpose, so as to further augment the temperature under pressure and in a confined vessel and to make such pressure available for use in lieu of steam-pressure produced through the combustion of carbonaceous fuel.

It will of course be understood that the slag which is fed to the boiler or steam-generator is maintained out of contact with the water either by being directed around the exterior of the boiler-shell or passed through tubes in the boiler in the manner of an ordinary fire-tube boiler.

Feed-water as drawn from nature may be at a minimum temperature of 32° Fahrenheit, or freezing. Its temperature may be raised in an open vessel at sea-level to approximately 212° Fahrenheit. In other words, about 180° may thus be added to its temperature, or if the total temperature be raised under pressure to 344° Fahrenheit an effective working steam-pressure of one hundred and twenty-five pounds per square inch may be produced. One hundred and eighty degrees of temperature may thus be supplied to feed-water in an open vessel and 120° may thereafter be added to it under pressure in producing one hundred and twenty-five pounds of effective steam-pressure. The delivery of these heat units in an open vessel is comparatively easy to accomplish, while the delivery of the remaining 120° under pressure I have found from my experiments is difficult.

It is of great importance that the waste heat units derivable from blast-furnace slag should be utilized to the utmost extent, as this steam-power is desirable for many purposes. It is therefore important that in conducting this method of generating steam-pressure all available heat units be utilized. After the congealed slag has been discharged from the steam-generator it will necessarily still contain available heat units to an important extent. The temperature of this discharged congealed slag will rarely fall below 400° Fahrenheit at the instant of its discharge, and it may easily exceed 900° Fahrenheit, according to the rapidity with which it is discharged from the molds or receptacles of the steam-generator. Inasmuch as water at 344° will produce approximately one hundred and twenty-five pounds steam-pressure, the spent slag after it is discharged from the steam-generator may be advantageously utilized in heating the feed-water in an open vessel. My preferred practice would be to utilize such spent slag to the utmost in heating the feed-water and thereafter using so much of the molten slag as might be found necessary in raising the temperature of the feed-water in the open vessel to approximately 212°. Thereafter I utilize as much more of the molten slag as might be found necessary to raise the temperature while the feed-water was contained in a closed vessel under pressure (about say one hundred and twenty-five pounds pressure or 344° Fahrenheit) or to any other pressure either more or less that might be found convenient for use in the particular service to which my present invention is adapted.

The importance of the method herein described will be apparent when it is considered that if approximately thirty-four per cent. of the heat of slag resulting from the operation of any copper plant is successfully utilized it will furnish all the power required to operate such plant. In so far as I am aware no successful attempt has heretofore been made to utilize the slag resulting from the smelting of copper ores. The problem of utilizing this slag is quite different from that of utilizing the slag from iron blast-furnaces. In the first place, with an iron-smelting furnace the slag is drawn off periodically—i. e., once in every six or eight hours—and therefore its continuous utilization in the generation of steam is extremely difficult. In the operation of copper-smelting, however, the slag flows in a practically continuous and uninterrupted stream from the forehearth. I am able, therefore, to utilize portions of this slag successively and continuously in the manner described. Furthermore, the slag from an iron-furnace is largely a silicate of lime, alumina, &c., practically devoid of iron. On the other hand, copper blast-furnace slags may and do contain from twenty per cent. to fifty-five per cent. of iron. For this reason they are much more efficient in supplying heat. Notwithstanding these advantages, however, prior attempts to utilize these slags have not been successful, owing in part to the enormous shrinkage of these slags in cooling, amounting to approximately one-quarter inch per foot, to the corrosive nature of the slag which contains elements capable of dissolving almost any of the refractories found in nature, and to the rapid formation of non-conducting skulls. It has therefore been impossible to maintain the slag in any one operation in such condition and relation to the water as to bring the latter to the proper steam-generating temperature, especially within boilers. These difficulties I avoid in large measure by bringing the feed-water to a high temperature in an open vessel, using for this purpose the spent slag which has been passed rapidly through the generator, together with as much fresh slag as may be necessary.

I claim—

1. The herein-described method of utilizing slag from copper-smelting furnaces for the generation of steam, which consists in utilizing a portion of the slag to preheat feed-water to a relatively high temperature before it enters the generator, and completing the heating within the generator by the further use of slag out of direct contact with the water; substantially as described.

2. The method herein described which consists in taking a portion of the molten slag from a furnace, heating therewith water not under pressure, and taking the remainder of the slag and heating said water under pressure and out of direct contact therewith for the generation of steam; substantially as described.

3. The method herein described which consists in taking a portion of the molten slag from a furnace, heating therewith water not under pressure, and taking a portion of the remainder of the slag and heating said water under pressure and out of direct contact therewith for the generation of steam; substantially as described.

4. The method of utilizing slag from copper-smelting furnaces for the generation of steam, which consists in preheating feed-water in an open vessel to a relatively high temperature by the use of spent slag from a slag-generator and also by molten slag from the furnace, and completing the heating under pressure in a slag-generator wherein the slag and water are maintained out of mutual contact; substantially as described.

5. The herein-described method of generating steam which consists in preheating feed-water by means of hot slag, feeding the preheated feed-water to a steam-generator, and passing hot slag through the generator out of contact with the water.

6. The herein-described method of generating steam which consists in introducing preheated feed-water into a steam-generator, and passing hot slag through the generator out of contact with the water to generate steam by radiation from the slag to the water.

7. The herein-described method of generating steam which consists in passing hot slag through a steam-generator out of contact with the water to generate steam by radiation from the slag to the water, and utilizing the spent slag from the generator to preheat feed-water.

In testimony whereof I have hereunto set my hand.

RALPH BAGGALEY.

Witnesses:
JOHN MILLER,
H. M. CORWIN.